United States Patent
Ullmann

(10) Patent No.: US 10,673,026 B2
(45) Date of Patent: Jun. 2, 2020

(54) BATTERY CELL HOUSING AND METHOD FOR PRODUCING SAME

(71) Applicant: Schuler Pressen GmbH, Göppingen (DE)

(72) Inventor: Bernd Ullmann, Pfinztal (DE)

(73) Assignee: Schuler Pressen GmbH, Göppingen (DE)

(*) Notice: Subject to any disclaimer, the term of this patent is extended or adjusted under 35 U.S.C. 154(b) by 173 days.

(21) Appl. No.: 15/738,812

(22) PCT Filed: Jun. 14, 2016

(86) PCT No.: PCT/EP2016/063641
§ 371 (c)(1),
(2) Date: Dec. 21, 2017

(87) PCT Pub. No.: WO2016/207027
PCT Pub. Date: Dec. 29, 2016

(65) Prior Publication Data
US 2018/0287102 A1      Oct. 4, 2018

(30) Foreign Application Priority Data
Jun. 25, 2015   (DE) .................. 10 2015 110 244

(51) Int. Cl.
*H01M 2/02*     (2006.01)
*H01M 10/00*    (2006.01)
(Continued)

(52) U.S. Cl.
CPC ....... *H01M 2/0237* (2013.01); *H01M 2/0217* (2013.01); *H01M 2/0257* (2013.01);
(Continued)

(58) Field of Classification Search
CPC ............ H01M 2/0217; H01M 2/0237; H01M 2/0257; H01M 2/0426; H01M 2/0456; H01M 10/058; Y02T 10/7005
(Continued)

(56) References Cited

U.S. PATENT DOCUMENTS

| | | | |
|---|---|---|---|
| 3,816,181 A | 6/1974 | Buckethal | |
| 5,968,442 A | 10/1999 | Sato | |

(Continued)

FOREIGN PATENT DOCUMENTS

| | | |
|---|---|---|
| CN | 1243605 A | 2/2000 |
| CN | 104011896 A | 8/2014 |

(Continued)

OTHER PUBLICATIONS

Machine translation of JP 2004-195490 (no date).*
(Continued)

*Primary Examiner* — Amanda C. Walke
(74) *Attorney, Agent, or Firm* — Fitch, Even, Tabin & Flannery LLP

(57) ABSTRACT

A battery cell housing includes a housing shell and a housing cover. A bearing surface and a first connecting surface separate thereto are present on the housing shell (16) on at least two mutually facing side walls or on all side. A contact surface on the housing cover is associated with each bearing surface and a second connecting surface on the housing cover is associated with the first connecting surface. The relative position of the second connecting surface and of the contact surface is adapted to the relative position of the bearing surface and of the first connecting surface. The contact surface and the second connecting surface can thus be spaced apart in the vertical direction (H) and/or the
(Continued)

second connecting surface is present on an edge side strip extending downwards in the vertical direction (H) to a bottom of the housing shell.

15 Claims, 5 Drawing Sheets

(51) Int. Cl.
  *H01M 10/058* (2010.01)
  *H01M 2/04* (2006.01)
(52) U.S. Cl.
  CPC ......... *H01M 2/0456* (2013.01); *H01M 10/00* (2013.01); *H01M 10/058* (2013.01); *H01M 2002/0297* (2013.01); *Y02T 10/7005* (2013.01)
(58) Field of Classification Search
  USPC .......................................................... 429/163
  See application file for complete search history.

(56) References Cited

U.S. PATENT DOCUMENTS

| | | | |
|---|---|---|---|
| 6,746,798 | B1 | 6/2004 | Hiratsuka et al. |
| 8,551,649 | B2 * | 10/2013 | Suzuki ................ H01M 2/0237 429/163 |
| 9,521,771 | B2 * | 12/2016 | Shishido ................ H05K 13/00 |
| 2014/0087223 | A1 | 3/2014 | Hamakawa |
| 2014/0370370 | A1 | 12/2014 | Kawase |
| 2015/0017520 | A1 | 1/2015 | Kwak et al. |
| 2015/0099154 | A1 * | 4/2015 | Okuda .................... H01M 2/18 429/142 |
| 2016/0254501 | A1 * | 9/2016 | Saimaru ................ H01M 2/024 429/185 |

FOREIGN PATENT DOCUMENTS

| | | |
|---|---|---|
| DE | 69705174 T2 | 5/2002 |
| DE | 102013219246 A1 | 3/2014 |
| EP | 2157633 A1 | 2/2010 |
| JP | 2004195490 A | 7/2004 |
| JP | 2010027436 A | 2/2010 |
| WO | 2010146700 A1 | 12/2010 |

OTHER PUBLICATIONS

Machine translation of JP 2010-027436 (no date).*
International Search Report in corresponding International Application No. PCT/EP2016/063641, dated Aug. 1, 2016, 6 pages.
German Office Action in Corresponding German Application No. DE 10 2015 110 244.7, dated Dec. 6, 2015, 11 pages.
Chinese Office Action dated Dec. 18, 2019, in corresponding Chinese Application No. 201680037052.3, with English translation (18 pages).

* cited by examiner

BATTERY CELL HOUSING AND METHOD FOR PRODUCING SAME

CROSS REFERENCE TO RELATED APPLICATIONS

This patent application is the national phase of PCT/EP2016/063641 filed Jun. 14, 2016, which claims the benefit of German Patent Application No. 10 2015 110 244.7 filed Jun. 25, 2015.

TECHNICAL FIELD

The invention relates to a battery cell housing for accommodating the core material of the battery cell providing the electrical energy. For example, this may be a battery cell housing for a winding cell.

BACKGROUND

A battery cell housing made of plastic material has been known from Publication DE 69705174 T2. It comprises a housing shell and a cover that are welded to each other. To accomplish this, a resistance heating element is interposed between the cover and the housing shell. By applying a voltage to the resistance heating element, it is possible to weld the housing cover and the housing shell together at a location that is not accessible from the outside. Likewise, publication JP 11260326 A describes a battery cell housing in which a housing cover is connected to a housing shell by means of resistance welding.

Publication DE 10 2013 219 246 A1 discloses a battery cell with a battery cell housing having the shape of a cuboid that is disposed to accommodate an electrolyte solution. The housing comprises a housing shell with a housing opening. The housing opening is closed in a fluid-tight manner by means of a housing cover, in which case the housing cover may be welded to the housing shell.

Welding the housing cover to the housing shell is expensive. In order to be able to carefully and tightly seal the inner space enclosed by the battery cell housing, it is necessary to ensure the precise positioning of the housing cover on the housing shell before or during welding, in particular if the parts to be welded together are joined by laser beam welding within a highly limited focal range.

SUMMARY

Considering this, the object of the present invention may be viewed to be the provision of an improved battery cell housing, as well as a method for producing same, which, in particular, simplifies handling of the battery cell during production.

In accordance with the invention, a battery cell housing for the accommodation of the core material of the battery cell is provided. The battery cell may be a primary cell or a secondary cell. The battery cell housing comprises a housing shell as well as a housing cover. The housing shell has a rectangular bottom from which extend four side walls in a vertical direction. The side walls and the bottom are preferably made integrally of a uniform material, without seams and joints. In particular, the housing cover consists of the same material as the housing shell, preferably a metal or a metal alloy, and, for example, steel or aluminum.

Two adjacent side walls that are joined to each other have a common connecting location extending in vertical direction, said connecting location potentially being rounded in a radius. The radius may be, for example, in a range of 0.1 mm to 25.0 mm and, preferably, in a range of 0.5 mm to 5.0 mm.

The bottom and the side walls delimit an inner space having a cuboid shape. The inner space is accessible on the side opposite the bottom at a housing opening, before the housing opening is closed by means of the housing cover. Before sealing, the core of the battery cell providing the electrical energy is inserted and/or filled into the battery cell housing.

At least two, and preferably all, side walls have a bearing surface for the housing cover in their upper section adjacent to the housing opening and, in addition, a first connecting surface. The housing cover has at least one connecting surface. The housing cover has, on at least two of its cover side regions and preferably on all four cover side regions, a contact surface for each bearing surface and a second contact surface for each existing first connecting surface. A contact surface abuts against each bearing surface. Each first connecting surface is associated with a second connecting surface that face each other and, preferably, also abut against each other. The two connecting surfaces are connected to each other in a material-bonded manner by a welding connection. Preferably, four first connecting surfaces and four second connecting surfaces are provided, each forming a connecting surface arrangement that is closed in the form of a ring. Each connecting surface arrangement is closed—viewed in peripheral direction about the vertical direction. When these two annularly closed connecting surface arrangements are welded together, the inner space of the housing is sealed completely and tightly relative to the environment.

The contact surface and the second connecting surface are arranged offset in vertical direction at a distance from each other on the housing cover and thus do not directly abut against each other. Alternatively or additionally, the second connecting surface is formed on an edge-side strip extending obliquely or rectangularly relative to the vertical direction in the direction toward the bottom of the housing shell.

Due to the arrangement of the contact surface and the second connecting surface in vertical direction at a distance from each other, it is possible to provide a spatial separation between the mechanical contact of the housing cover on the housing shell, on the one hand, and the connecting surfaces existing for welding, on the other hand. Via the abutment of the contact surfaces against the bearing surfaces, a support is created, and the housing cover can be supported on the housing shell against a depressing force acting on the cover during the welding process. Independent of this depressing force, the respectively existing two to four pairs comprising a first connecting surface and a second connecting surface abut at a minimal distance relative to or directly against each other, so that—at that point—a material-bonded connection can be created by laser-welding in a highly simple manner. Independent of their function, thus different and spatially separated surfaces are provided both on the housing cover and on the housing shell.

Additionally or alternatively to the offset of the contact surface and the second connecting surface in vertical direction, the second connecting surface may also be present on an edge-side strip of the housing cover, said strip extending in the direction toward the bottom. In doing so, the second connecting surface may in particular be formed by the underside or the inside of this strip. This strip is located outside the housing opening and limits the pushing-away or bulging away of the adjacent housing wall from the respectively opposite wall when the housing cover is pressed against the housing shell with a depressing force.

Due to the edge-side strip, a border of the end section of the housing shell adjoining the housing opening can thus be created. Such a border has the added advantage that, when the housing cover is pressed onto the housing shell, a widening of the housing shell is prevented.

Due to these two, preferably combined, measures it is possible to precisely weld the connecting surfaces. In particular in laser-welding, it is of importance that an exact position of the connecting surfaces be maintained and that the connecting surfaces are within the focal range of the laser beam. The desired depth effect of the laser beam at the joint of the two connecting surfaces is thus ensured.

It is advantageous if a normal vector of the bearing surface and a normal vector of the contact surface are antiparallel. As a result of this, a planar contact between a bearing surface and the respectively associate contact surface is ensured. Additionally or alternatively, it is advantageous if a normal vector of the first connecting surface and a normal vector of the respectively associate second connecting surface are antiparallel. This, too, allows the achievement of a planar abutment at the joint. Preferably, each first connecting surface and the respectively associate second connecting surface are in contact with each other before the welding connection is produced.

In one exemplary embodiment, the normal vectors of the bearing surface and the first connecting surface are parallel to each other. In doing so, preferably, the bearing surface and the first connecting surface extend in planes that are offset relative to each other at a right angle with respect to the vertical direction. Accordingly, in doing so, also the normal vectors of the contact surface and of the second connecting surface are also oriented parallel to each other.

In a preferred exemplary embodiment, the housing cover has at least two groove-shaped recesses. Preferably, one groove-shaped recess extends parallel to each cover side surface of the housing cover, such recesses transitioning into each other in the corner regions of the housing cover. Each of the contact surfaces is formed by the groove bottom of each groove-shaped recess. Therefore, the contact surfaces are located within an outside contour of the housing cover. Accordingly, the bearing surfaces that are associated with the contact surfaces are located on a projection or end region of the side walls, said end region extending into the groove-shaped recess. The at least one groove-shaped recess is arranged at a distance from the respectively adjacent outside surface or cover side surface.

If the second connecting surface is arranged on the inside of the edge-side strip, the contact surface may directly adjoin the second connecting surface. In this exemplary embodiment, the first connecting surface adjoins the bearing surface—analogously thereto.

It is advantageous if the maximum wall thickness of each side wall is greater in the upper section than the maximum wall thickness of the same side wall in an adjoining lower section. The lower section of the side wall connects the upper section to the bottom of the housing shell. Preferably, the wall thickness in the lower section of a side wall is constant. The wall thickness in the upper section of a side wall be constant in one or more regions.

For example, the wall thickness within the upper section may be smaller in an end region extending in vertical direction from the upper side surface of the side wall up to the first connecting surface or the bearing surface than the maximum wall thickness within the upper section. As a result of this, an offset may be formed adjoining the upper side surface of the side wall. This offset may be open either toward the inner space or be open toward the outside from the inner space.

Due to the different wall thicknesses, material can be saved. Whereas in the upper section the bearing surface and the first connecting surface of a side wall are formed and the upper section makes the necessary wall thickness available therefor, it is possible to reduce the wall thickness in the lower section of the side wall to such an extend so as to provide the required stability of the side wall and reduce the use of material in the lower section as much as possible.

In conjunction with this it is particularly advantageous if the height of the lower section in vertical direction is greater than the height of the upper section.

Furthermore, it is advantageous if the first connecting surface extends in an oblique manner and/or at a distance with respect to an outside surface plane, in which extends the outside surface of the associate side wall facing away from the inner space. Thus, the first connecting surface is essentially completely outside the plane of the outside surface of the associate side wall. As a result of this, the accessibility to the connecting surface is improved during welding, i.e., in particular the accessibility by a laser beam during laser welding.

In another advantageous embodiment, the housing cover has, adjoining each contact surface, respectively one inclined surface whose normal vector is oriented obliquely with respect to a normal vector of the adjacent inclined surface. Inclined surfaces on two opposing cover sides approach each other in vertical direction and in the direction toward the bottom of the housing shell. With the aid of such inclined surfaces, a positioning aid may be provided to make it possible to move the housing cover on a housing shell into a specified position.

For example, it is advantageous if the inclined surface is formed by a groove flank of a groove-shaped recess of the housing cover. Preferably, this is the groove flank that is located farther inside. In doing so, the groove bottom may form the respectively associate contact surface, as has already been explained hereinabove.

In another embodiment of the battery housing of the present invention, which embodiment may be provided additionally or alternatively to the previously described embodiments, the battery cell housing comprises a housing shell with a bottom and four side walls that extend from the bottom in a vertical direction. On the side opposite the bottom, the end regions of the side walls enclose a housing opening. The housing opening is closed by a housing cover that is welded together with the respective end region of the side walls and is thus connected in a material-bonded manner. Two opposing side walls have a smaller minimum wall thickness than the two other opposing side walls. The minimum wall thickness of one side wall determines its stability if—during the production of the battery cell or later in assembly position—outer forces act on the battery cell housing. In doing so, it is sufficient to provide two of the four side walls with a minimum wall thickness determining the stability, because the impacting outer forces mainly always act on the battery cell housing from the same direction. The minimum wall thickness of the two other side walls may be smaller, as a result of which material is saved. Nevertheless, the housing shell exhibits an overall sufficient dimensional stability in assembly position and while the housing cover is being pressed on.

The cross-sectional surface of the two side walls having the greater wall thickness is preferably smaller than the cross-sectional surface of the two other side walls having the smaller wall thickness—each viewed at a point exhibiting the minimum wall thickness.

BRIEF DESCRIPTION OF THE DRAWINGS

Advantageous embodiments of the invention can be inferred from the dependent claims, the description and the drawings. Hereinafter, details are explained with reference to preferred exemplary embodiments of the invention and the appended drawings. They show in FIG. 1 a highly schematized perspective view of a battery cell housing comprising a housing shell, a housing cover, as well as the core material of the battery cell, arranged in the housing shell;

DETAILED DESCRIPTION

Figure 1:
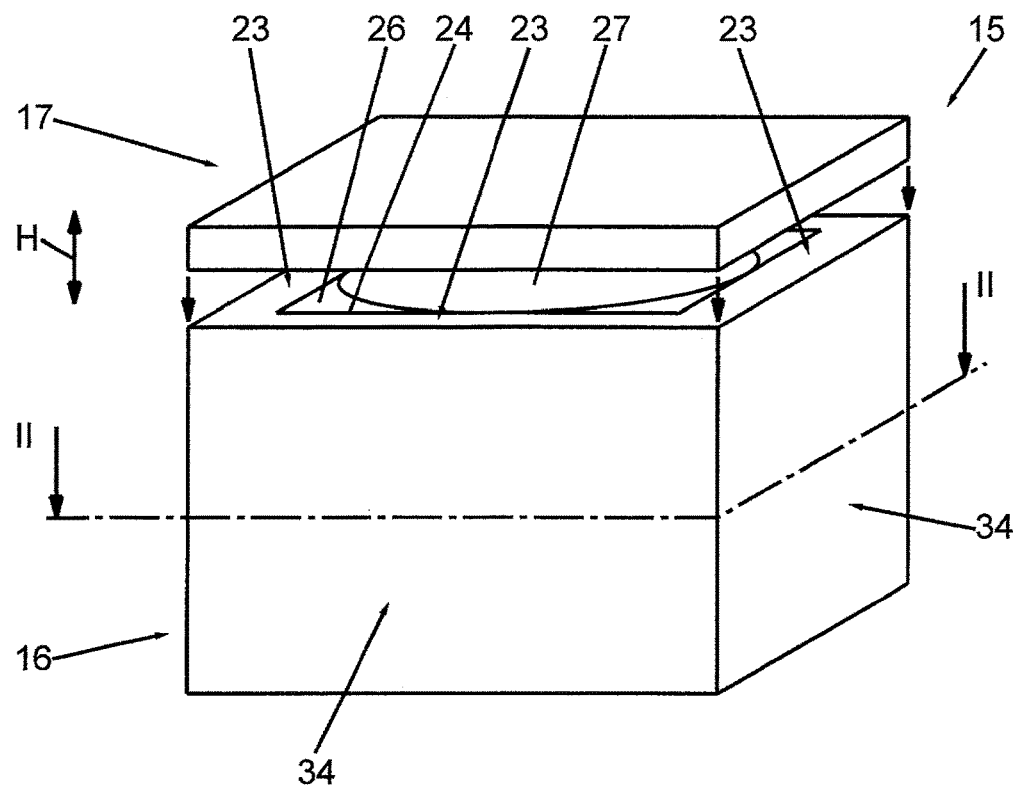

FIG. 1 is a schematic representation of an exemplary embodiment of a battery cell housing 15. The battery cell housing has, overall, a prismatic contour and, in accordance with the example, the contour of a cuboid. The housing comprises a housing shell 16, as well as a housing cover 17 that are connected to each other in a material-bonded manner by welding. In FIG. 1 the housing cover 17 is shown in an exploded view, remote from the housing shell 16.

The housing shell has a rectangular bottom 18. A side wall 19 extends from each side of the bottom 18. Adjoining the bottom 18, each side wall 19 has a lower section 20 and an upper section 21 adjoining said lower section in vertical direction H (cf., e.g., FIG. 3). The lower section 20 has a first height h1 in vertical direction H, and the upper section has a second height h2. The dimension of the second height h2 is smaller than that of the first height h1. The lower section 20—measured at a right angle relative to the vertical direction H—has a first wall thickness w1 that is constant in the exemplary embodiment and thus corresponds to the maximum wall thickness of the lower section 20. The upper section 21 has a maximum wall thickness that is referred to as the second wall thickness w2. The dimension of the second wall thickness w2 is greater than that of the first wall thickness w1.

The upper section 21 has at least one surface section 22 that extends at a right angle relative to the vertical direction H. At least one of the existing surface sections 22 forms the upper side surface 23 of the side wall 19. The four upper side surfaces 23 of the four side walls 19 enclose a housing opening 24 in the housing shell 16. To the extent that, as is illustrated for example in FIG. 3, there is another surface section 22 on the upper section 21, this additional surface section 22 is arranged relative to the upper side surface 23 in vertical direction H at a distance or in an offset manner. As a result of this, adjoining the upper side surface 23, there is formed an offset 25 in the upper section. The offset 25 may be open toward the outside of the housing shell in some exemplary embodiments (FIGS. 3-5) or, alternatively, be open toward an inner space 26 of the battery cell housing 15 that is delimited by the housing shell 16 and the housing cover 17.

The inner space 26 of the battery cell housing 15 is delimited by the bottom 18, the side walls 19 and the housing cover 17 and is disposed to accommodate the core material 27, for example at least one winding body that is disposed for providing electrical energy of the battery cell. In an alternative embodiment, the core material 27 may also be a fluid material.

Figure 2:
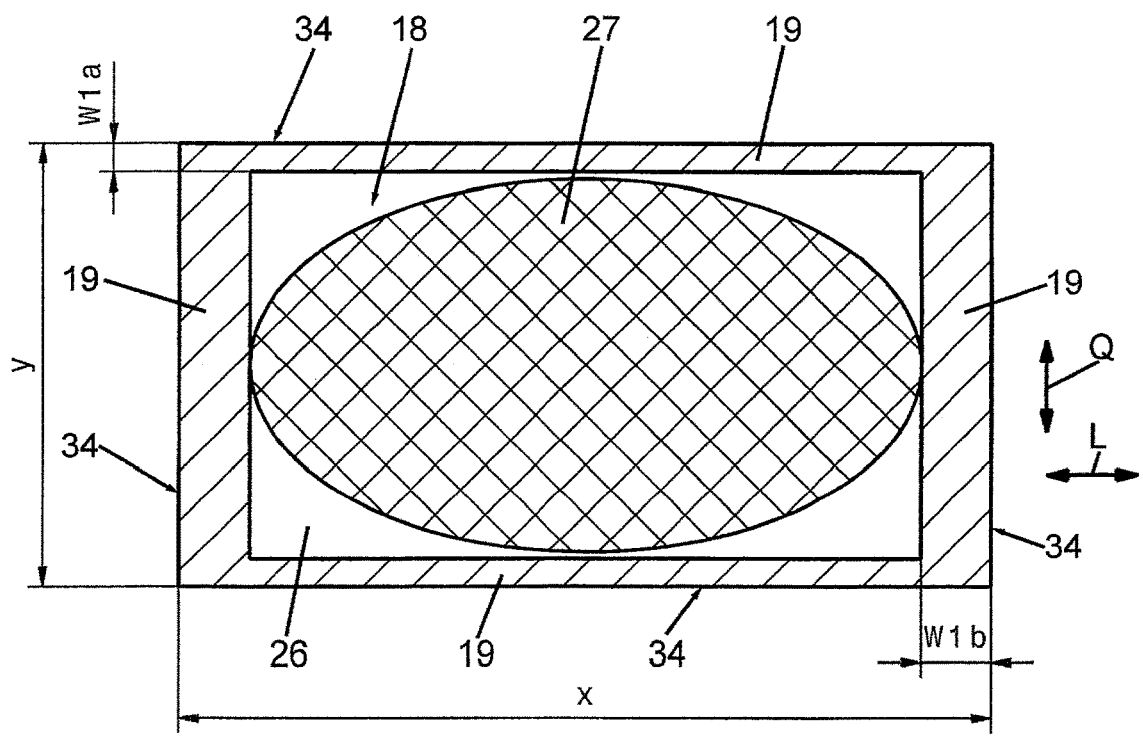
FIG. 2 a section through the housing shell of FIG. 1 along intersecting line II-II in an intersecting plane at a right angle with respect to a vertical direction through a lower section of the housing walls of the housing shell.

FIG. 2 shows an exemplary embodiment of the housing shell 16, in which the side walls 19 have different first wall thicknesses w1 in the lower sections 20. Two opposing side walls have a smaller first wall thickness w1$a$, whereas the other two opposing side walls have a greater first wall thickness w1$b$. Preferably, the side walls 19 having the smaller first wall thickness w1$a$—measured at a right angle relative to the vertical direction H in longitudinal direction L—have a length x, and the side walls having the greater first wall thickness w1$b$—measured at a right angle relative to the vertical direction H and relative to the longitudinal direction L in a transverse direction Q—have a width y. In doing so, the dimension of the width y—in accordance with the example—is smaller than the dimension of the length x. In doing so, in assembly position of the battery cell housing 15, a force mainly acts on the battery cell housing 15, said force being oriented in transverse direction Q and thus being supported by the two side walls having the greater first wall thickness w1$b$. In order to save material, the side walls 19 extending in longitudinal direction L are therefore configured with a smaller first wall thickness w1$b$.

In the upper section 21, all side walls may have the same form and have the same wall thicknesses, irrespective of whether or not—as shown by FIG. 2—the first wall thicknesses w1$a$, w1$b$ have different dimensions in the lower sections 20 of the side walls 19.

Figure 8:
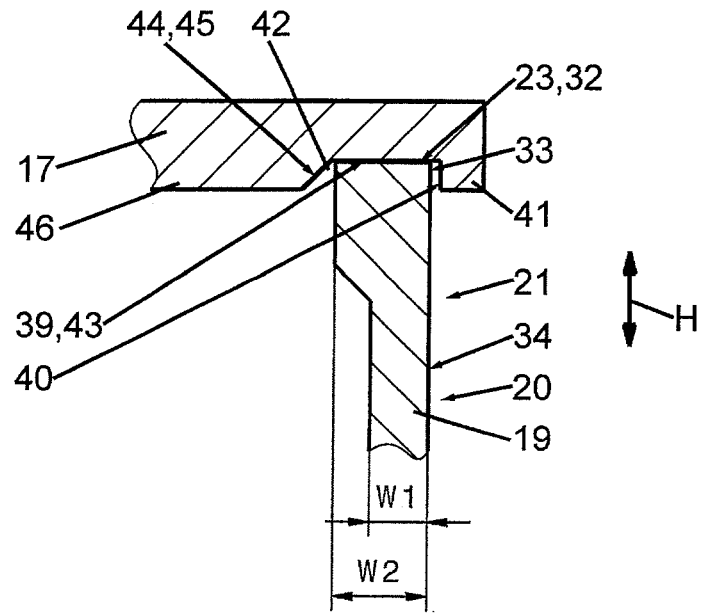
Figure 9:
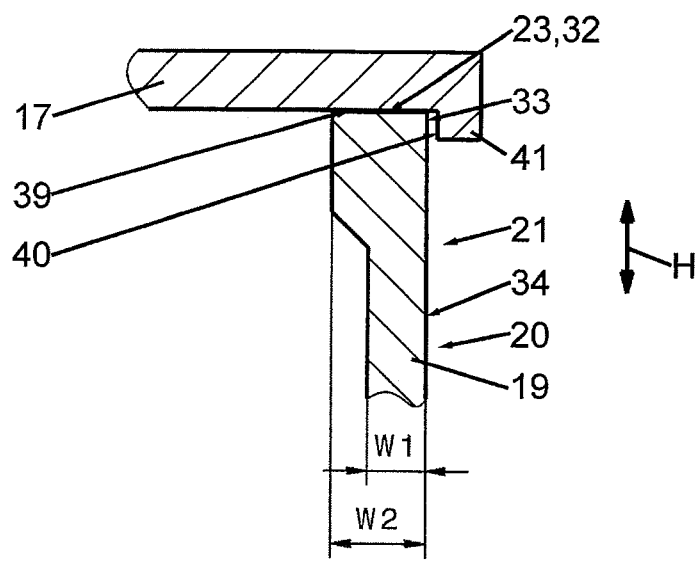

On at least two opposing side walls 19 and, in accordance with the example, on all side walls 19, the one or one of the present surface sections 22, respectively, forms a bearing surface 32. In the exemplary embodiment shown by FIG. 3, the bearing surface 32 is formed by the respective upper side surface 23. Furthermore, in the upper section 21, there is a first connecting surface 33 that may be formed by another surface section 22. Alternatively, the first connecting surface 33 may also be formed by a surface region that adjoins the bearing surface 32 and is oriented in an inclined manner or rectangularly relative to the bearing surface 32. For example, the first connecting surface 33 may be formed by the region of an outside surface 34 of the relevant side wall 19 adjoining the upper side surface 23, in which case the outside surface 34 faces away from the inner space 26 of the battery cell housing (FIGS. 8 and 9).

Figure 3:
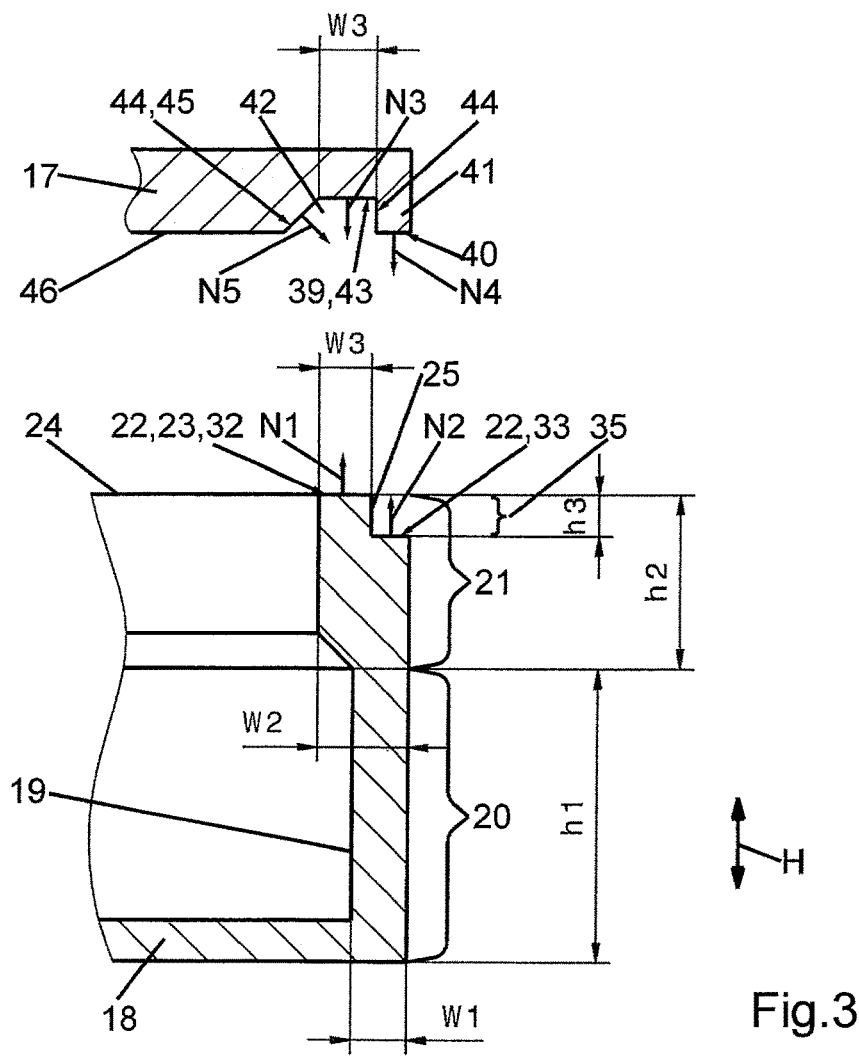
FIGS. 3 and 4 each a schematic representation, partially in section, through the housing cover, as well as one of the side walls of the housing shell, in one exemplary embodiment of the battery cell housing.

In the exemplary embodiments according to FIGS. 3-7 the bearing surface 32, as well as the first connecting surface 33, each has a normal vector N1 and N2, respectively, these being oriented parallel with respect to each other (FIG. 3). In other words, the bearing surface 32 and the first connecting surface 33 extend parallel to each other. The first normal vector N1 of the bearing surface 32 and the second normal vector N2 of the first connecting surface 33 point away from the bottom 18. The bearing surface 32 and the first connecting surface 33 are arranged at a distance from each other or offset with respect to each other in vertical direction H, wherein the distance is referred to as the third height h3. The third height h3 also dictates the height of an end section 35 within the upper section 21. In the exemplary embodiments according to FIGS. 3-7, the wall thickness in this end section 35 is reduced or smaller than the maximum wall thickness in the upper section 21 and the second wall thickness w2, respectively. This third height h3 thus corresponds to the height of the offset 25.

Figure 4:
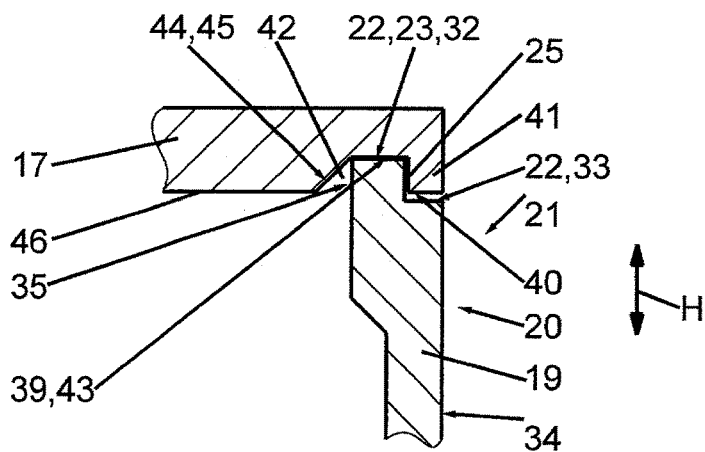
Figure 5:
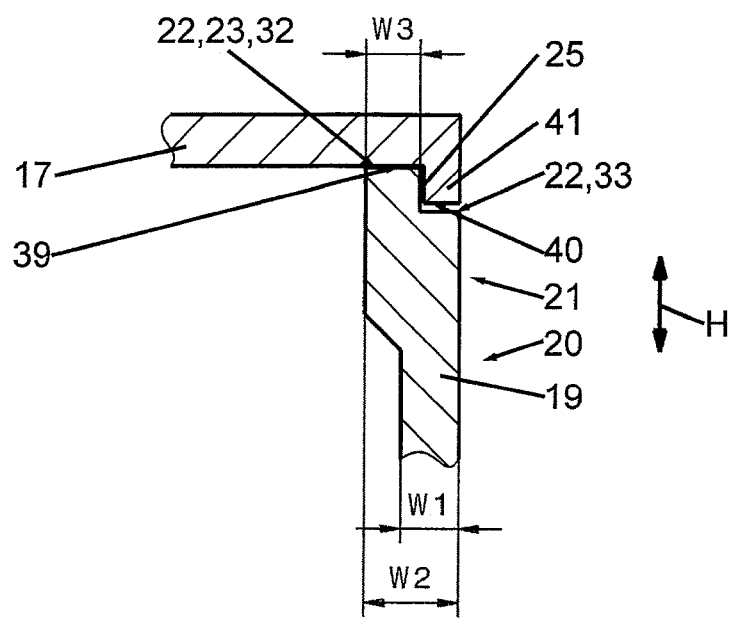
FIGS. 5 to 9 each an additional schematic representation, partially in section, of a side wall and the housing cover, in other exemplary embodiments of the battery cell housing.

In the exemplary embodiments according to FIGS. 3-5, the first connecting surface 33 is closer to the bottom 18 than the bearing surface 32. In doing so, the offset 25 is open toward the outside. In the exemplary embodiments according to FIGS. 6 and 7, the offset 25 is open toward the inside, and the bearing surface 32 is closer to the bottom 18 than the first connecting surface 33.

Figure 6:
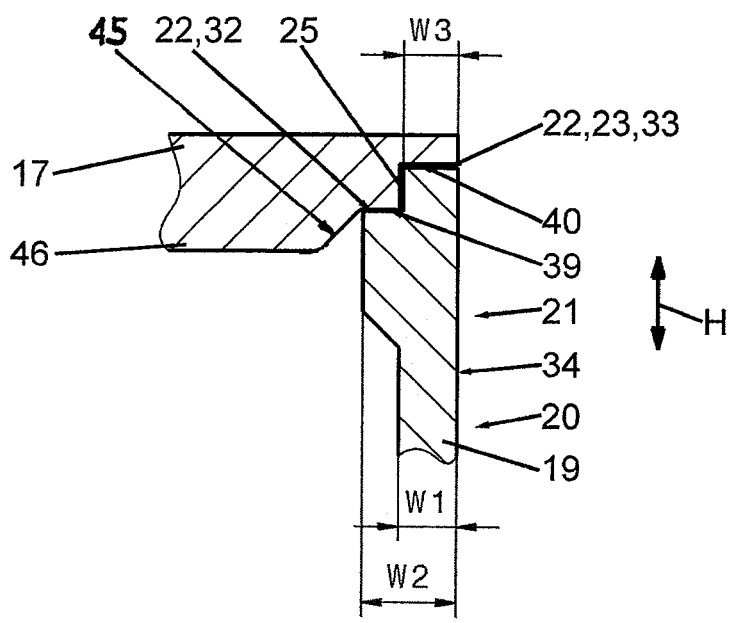
Figure 7:
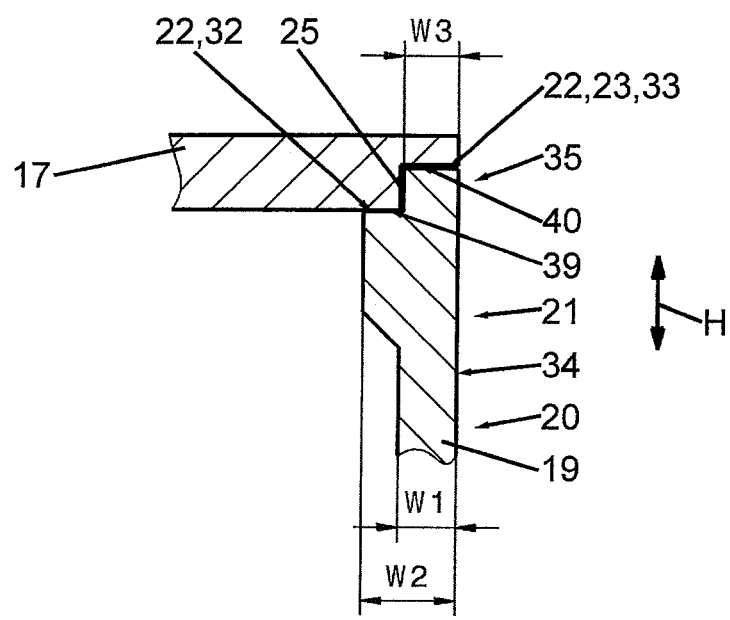

In the exemplary embodiments according to FIGS. 6 and 7, the upper side surface 23 forms the first connecting surface 33. In the end section 35, the wall thickness of the side wall 19 corresponds to a third wall thickness w3 that, preferably, corresponds approximately to the first wall thickness w1.

In the exemplary embodiments according to FIGS. 8 and 9, the end section 35 having the reduced third wall thickness w3 is omitted. In this case, the upper section 21 has the second wall thickness w2 adjoining the upper side surface 23.

As has already been explained, the dimensions and the form of the upper section 21 in all four side walls 19 are preferably identical, irrespective of whether or not their lower sections 20 have the second wall thicknesses w2a and w2b, respectively.

In adaptation to the housing shell 16, the housing cover 17 has a rectangular surface. Preferably, said cover is configured as a plate-like component. The housing cover 17 has a contact surface 39 with a third normal vector N3 (FIG. 3). Furthermore, a second connecting surface 40 with a fourth normal vector N4 exists on the housing cover 17. In the preferred exemplary embodiment described here, the third normal vector N3 is oriented antiparallel to the first normal vector N1 of the bearing surface 32. The fourth normal vector N4 of the second connecting surface 40 is oriented antiparallel to the second normal vector N2 of the first connecting surface 33.

In the exemplary embodiments according to FIGS. 3-7, the contact surface 39 and the second connecting surface 40 are oriented parallel to each other, so that their normal vectors N3, N4 also extend parallel to each other. In vertical direction H1, the contact surface 39 and the second connecting surface 40 are arranged at a distance from each other, in which case this distance is preferably as great as the distance between the first connecting surface 33 and the bearing surface 32 of the associate side wall 19 and the housing shell 16, respectively. Alternatively, the distance between the contact surface 39 and the second connecting surface 40 may also be slightly smaller than the distance between the first connecting surface 33 and the bearing surface 32, so that—if the contact surface 39 is in abutment with the associate bearing surface 32—the two connecting surfaces 33, 40 abut against each other or display a minimal distance between each other. At this point it should be noted that the schematic representations in the drawings are not true to scale and that the illustrations are used for explanation of the principle only.

In the exemplary embodiments according to FIGS. 3-5, as well as 8 and 9, each of the second connecting surfaces 40 is provided on an edge-side strip 41. Each strip 41 extends in transverse direction Q or in longitudinal direction L, along a respective cover side of the housing cover 17. The edge-side strips 41 are thus located in pairs on opposing cover sides.

In the exemplary embodiments of FIGS. 3-5 the fourth normal vector N4 points in vertical direction H, and the second connecting surface 40 is arranged on the underside of the edge-side strip 41. The contact surface 39 is arranged in longitudinal direction L and in transverse direction Q, respectively, adjacent to the edge-side strip, adjoining the latter. As in the exemplary embodiments according to FIGS. 3, 4 and 8, said contact surface may be provided in a groove-shaped recess 42, in which case the contact surface 39 is formed by the groove bottom 43. Adjoining the groove bottom 43, there is one groove flank 44, respectively, adjoining the two opposing sides, in which case one groove flank is provided on the edge-side strip 41 and the opposite groove flank 44 is arranged offset inward from the edge of the housing cover 17 and may be referred to as the inner groove flank. This inner groove flank of the two groove flanks 44 is preferably an inclined surface 45 with a fifth normal vector N5 that is oriented at an angle smaller than 90° and greater than 0° with respect to the third normal vector N3, and preferably smaller than 70° and greater than 25°. The groove-shaped recess 42 widens through the inclined surface 45 starting from the groove bottom 43 in the direction of the normal vector N3, i.e., in the direction toward the housing shell 16.

Preferably, the groove-like recess 42 extends along the two cover sides extending in longitudinal direction L as well as along the two cover sides extending in transverse direction Q, so that a circumferential groove is being formed. In doing so, the inclined surfaces 45 enclose a center portion 46 of the housing cover 17, said center portion tapering toward the housing shell 16.

The center portion 46 or the inclined surfaces 45 can be used as a positioning aid when the housing cover 17 is placed on the housing shell 16 in order to seal the housing opening 24. The distances of two edges between two inclined surfaces 45 and the adjacent groove bottom 43—measured in longitudinal direction L or in transverse direction Q—correspond to the dimension of the housing opening 24 delimited by the upper side surface 23 in longitudinal direction L and in transverse direction Q, respectively. In this manner, the housing cover 17 can be placed on the housing shell 16 in such a manner that the center portion 46 engages in the housing opening 24 when, in accordance with the example, four pairs of respectively one bearing surface 32 and one associate contact surface 39 abut against each other. When the housing cover 17 is attached slightly offset with respect to its ideal position in longitudinal direction L and/or in transverse direction Q, at least one of the inclined surfaces 45 acts as an insertion guide, along which slides the inner edge of the upper side surface 32 of the housing shell 16, said inner edge delimiting the housing opening 24.

As a result of the fact that, in addition, each cover side has an edge-side strip 41 extending in longitudinal direction L and in transverse direction Q, respectively, according to the example the center portion 46, as it were, reaches around the inside of the end section, and the edge-side strip 41 reaches around the outside. This embodiment is a particularly preferred version in order to achieve—before creating the material-bonded connection between the housing cover 17 and the housing shell 16—a precisely defined relative positioning. Likewise, if the housing cover 17 is pressed with force against the housing shell 16, there is no widening of the housing opening in this embodiment. The four pairs, respectively comprising a first connecting surface 33 and a second connecting surface 40, are in a defined position relative to each other and can be welded to each other in a reliable process after the housing cover 17 has been attached, so that the inner space 26 of the battery cell housing 15 is sealed with respect to the environment.

In the exemplary embodiment according to FIG. 6 one inclined surface 45 also adjoins the contact surface 39 on the inside, in which case all four inclined surfaces 45 together delimit the center portion 46. In this embodiment, the groove flank 44 opposite the inclined surface 45 is omitted, and, as it were, a step open toward the respectively associate side wall 19 is formed by the inclined surface 45 and the contact surface 39. This step is adjoined by a further step where the second connecting surface 40 is arranged offset in vertical direction and at a distance from the contact surface 39, said second connecting surface thus extending directly up to the outer edge of the housing cover 17.

FIG. 7 shows an embodiment that is similar to that of FIG. 6, in which case there are no center portion 46 and no inclined surfaces 45. All the contact surfaces 39 extend on the outer edge of a central flat surface of the housing cover 17, said flat surface facing the inner space 26.

In the exemplary embodiments according to FIGS. 3-7, the two connecting surfaces 33 and 40, respectively, that are associated with each other, are welded together by a laser beam that is directed at the battery cell housing 15, essentially at a right angle with respect to the outside surface 34 of the respective side wall.

In the two exemplary embodiments according to FIGS. 8 and 9, the upper side surface 23 of each side wall 19 is not formed by surface sections that are offset relative to each other in vertical direction H. As explained, the first connecting surface 33 representing the upper region of the outside surface 34 adjoins the upper side surface 32 and is oriented at a right angle with respect to the upper side surface 32. Accordingly, the second connecting surface 40 on the housing cover 17 is formed by the inside surface of the edge-side strip 41 in these exemplary embodiments. In doing so, the inside surface of the respectively associate outside surface 34 faces the respective side wall 19 and has a normal vector that extends at a right angle with respect to vertical direction H.

In order to produce a battery cell, the housing shell 16 and the housing cover 17 are first produced separately. This can be achieved by a primary forming process or by a forming process using a blank. For example, the housing shell 16 and/or the housing cover 17 may be produced by impact extrusion.

Subsequently, the core material 27 is introduced into the housing shell 16 through the housing opening 14. After introducing the core material 27, the housing cover 17 is placed on the housing shell 16 until the desired relative position is achieved and each contact surface 39 of the housing cover 17 abuts against an associate bearing surface 32 of the housing shell 17. Finally, each second connecting surface 40 existing on the housing cover 17 is welded to the respectively associate first connecting surface 33 on the housing shell 16, in particular, by laser-welding. Instead of laser-welding, it is also possible to produce the material-bonded connection by friction-welding, electromagnetic pulsing, ultrasonic welding or induction welding. Before and during the welding process, the housing cover 17 is preferably pressed by a compressive force in vertical direction H against the housing shell 16 and is thus preferably automatically centered, which may be accomplished—according to the example—by means of inclined surfaces 45 existing on the housing cover 17.

In modification of the illustrated exemplary embodiments, it is also possible to provide a region that conically widens toward the housing opening 24 on the housing shell 16 as a centering aid—additionally or alternatively to the inclined surfaces on the center portion 46 of the housing cover 17.

The invention relates to a battery cell housing 15 comprising a housing shell 16 and a housing cover 17. A bearing surface 32 and a first connecting surface 33 separate thereto are present on the housing shell 16 on at least two mutually facing side walls 19 or on all side walls 19, which surfaces can be arranged spaced apart from each other in a vertical direction H. A contact surface 39 on the housing cover 17 is associated with each bearing surface 32, and a second connecting surface 40 on the housing cover 17 is associated with the first connecting surface 33. The relative position of the second connecting surface 40 and of the contact surface 39 is adapted to the relative position of the bearing surface 32 and to the first connecting surface 33. The contact surface 39 and the second connecting surface 40 can thus be spaced apart in the vertical direction H, and/or the second connecting surface 40 is present on an edge-side strip 41 extending downwards in the vertical direction H to a bottom 18 of the housing shell 16. In this way, the second connecting surface 40 can be arranged on the underside or the inner side of the strip 41.

LIST OF REFERENCE SIGNS

15 Battery cell housing
16 Housing shell
17 Housing cover
18 Bottom
19 Side wall
20 Lower section of the side wall
21 Upper section of the side wall
22 Surface section
23 Upper side surface
24 Housing opening
25 Offset
26 Inner space
27 Core material
32 Bearing surface
33 First connecting surface
34 Outside surface
35 End section
39 Contact surface
40 Second connecting surface
41 Edge-side strip
42 Recess
43 Groove bottom
44 Groove flank
45 Inclined surface
46 Center portion
H Vertical direction
h1 First height
h2 Second height
h3 Third height
L Longitudinal direction
N1 First normal vector
N2 Second normal vector
N3 Third normal vector
N4 Fourth normal vector
N5 Fifth normal vector
Q Transverse direction
w1 First wall thickness
w1a Smaller first wall thickness
w1b Greater first wall thickness
w2 Second wall thickness
w3 Third wall thickness x Length
Y Width The invention relates to a battery cell housing (15) comprising a housing shell (16) and a housing cover (17). A bearing surface (32) and a first connecting surface (33) separate thereto are present on the housing shell (16) on at least two mutually facing side walls (19) or on all side walls (19), which surfaces can be arranged spaced apart from each other in a vertical direction (H). A contact surface (39) on the housing cover (17) is associated with each bearing surface (32) and a second connecting surface (40) on the housing cover (17) is associated with the first connecting surface (33). The relative position of the second connecting surface (40) and of the contact surface (39) is adapted to the relative position of the bearing surface (32) and of the first connecting surface (33). The contact surface (39) and the second connecting surface (40) can thus be spaced apart in the vertical direction (H) and/or the second connecting surface (40) is present on an edge side strip (41) extending downwards in the vertical direction (H) to a bottom (18) of the housing shell (16). In this way, the second connecting surface (40) can be arranged on the underside or the inner side of the strip (41).

The invention claimed is:

1. Battery cell housing (15) for the accommodation of a core material (27) of the battery cell providing electrical energy, the battery cell housing comprising:
   a rectangular bottom (18) and four side walls (19) extending away from the bottom (18) in a vertical direction (H), wherein the bottom (18) and the side walls (19) form a housing shell (16) delimiting an inner space having a cuboid form,
   a rectangular housing cover (17) that is connected by welding in a material-bonded manner to the side of all side walls (19) of the housing shell (16) opposite the bottom (18),
   wherein at least two of the side walls (19) have, on their upper section (21) associated with the housing cover (17), respectively at least one bearing surface (32) for the housing cover (17) and a first connecting surface (33),
   wherein the housing cover (17) has, on at least two cover sides, respectively at least one contact surface (39) and a second connecting surface (40), wherein each of the at least one contact surface (39) abuts against an associated one of the at least one bearing surface (32) to support the housing cover (17), and wherein each first connecting surface (33) is associated with a second connecting surface (40), these being connected to each other by a welded joint, and
   wherein the at least one contact surface (39) and the second connecting surface (40) are arranged at a distance with respect to each other in vertical direction (H), and/or wherein the second connecting surface (40) is present on an edge-side strip (41) extending in the direction toward the bottom (18), and
   wherein a spatial separation exists between where the at least one contact surface (39) abuts the associated one of the at least one bearing surface (32) and the welded joint between the first connecting surface (33) and the second connecting surface (40).

2. Battery cell housing according to claim 1, wherein a normal vector (N1) of the bearing surface (32) and a normal vector (N3) of the respectively associated contact surface (39) are antiparallel, and that a normal vector (N2) of the first connecting surface (33) and a normal vector (N4) of the respectively associated second connecting surface (40) are antiparallel.

3. Battery cell housing according to claim 1, wherein the first connecting surface (33) and the respectively associated second connecting surface (40) abut against each other.

4. Battery cell housing according to claim 1, wherein a normal vector (N1) of the bearing surface (32) and a normal vector (N2) of the first connecting surface (33) are parallel to each other.

5. Battery cell housing according to claim 4, wherein a normal vector (N3) of each of the at least one contact surface (39) and a normal vector (N4) of each second connecting surface (40) are parallel to each other.

6. Battery cell housing according to claim 1, wherein the contact surfaces (39) are formed, respectively, by a groove bottom (43) of at least one groove-shaped recess (42) of the housing cover (17).

7. Battery cell housing according to claim 1, wherein a maximum wall thickness (w2) in the upper section (21) of a side wall (19) is greater than a maximum wall thickness (w1) in an adjoining lower section (20) of the side wall (19), said lower section connecting the upper section (21) to the bottom (18).

8. Battery cell housing according to claim 7, wherein a wall thickness (w3) within the upper section (21) is smaller in an end section (35), which extends in vertical direction (H) from a first upper side surface (23) of the side wall (19) to the first connecting surface (33) or to the bearing surface (32), than the maximum wall thickness (w2) within the upper section (21).

9. Battery cell housing according to claim 7, wherein a height (h1) of the lower section (20) is greater in vertical direction (H) than a height (h2) of the upper section (21).

10. Battery cell housing according to claim 1, wherein the first connecting surface (33) extends obliquely or at a distance from an outside surface plane, in which extends an outside surface (34) of the associated side wall (19), said outside wall facing away from the inner space (26).

11. Battery cell housing according to claim 1, wherein the housing cover (17) has, adjoining each of the at least one contact surface (39), respectively one inclined surface (45), which has a normal vector (N5) that is oriented in an inclined manner with respect to a normal vector (N3) of an adjacent one of the at least one contact surface (39).

12. Battery cell housing according to claim 11, wherein each of the inclined surfaces (45) is formed by respectively one groove flank (44) of a groove-shaped recess (42) of the housing cover (17).

13. Battery cell housing (15) for accommodation of a core material (27) of a battery cell providing an electrical energy, the battery cell housing comprising:
   a rectangular bottom (18) and four side walls (19) extending away from the bottom (18) in a vertical direction (H), wherein the bottom (18) and the side walls (19) form a housing shell (16) delimiting an inner space having a cuboid form, wherein at least two of the four side walls (19) have opposite the bottom (18) at least one bearing surface (32),
   a housing cover (17) that is connected by welding in a material-bonded manner at a welding joint to a side of the side walls (19) opposite the bottom (18), wherein the housing cover has on a least two sides a contact surface (39) abutting against an associated one of the at least one bearing surface (32) at a place spatially separated from the welding joint, wherein two opposing ones of the side walls (19) have, at least in a lower section (20) directly adjoining the bottom (18), a smaller minimum wall thickness (w1a) than another two walls of the opposing side walls (w1b).

14. Method for producing a battery cell with a battery cell housing (15) according to claim 1, the method comprising:
 introducing a core material (27) providing the electrical energy into the housing shell (16) that delimits an inner space (26) having a cuboid form,
 covering the opening of the housing shell (16) by placing the housing cover (17) having the at least two contact surfaces (39) on the at least two bearing surfaces (32) and by pressing the housing cover (17) against the housing shell (16) in vertical direction (H),
 connecting the at least two first connecting surfaces (33) in a material-bonded manner by welding to the respectively associated second connecting surface (40).

15. The method according to claim 14, further comprising abutting the first connecting surface (33) and the respectively associated second connecting surface (40) against each other before producing the welded joint.

\* \* \* \* \*